Dec. 30, 1969      D. L. HILLHOUSE      3,487,402
DIGITAL CAPACITANCE MOTION TRANSDUCER
Filed Sept. 8, 1966
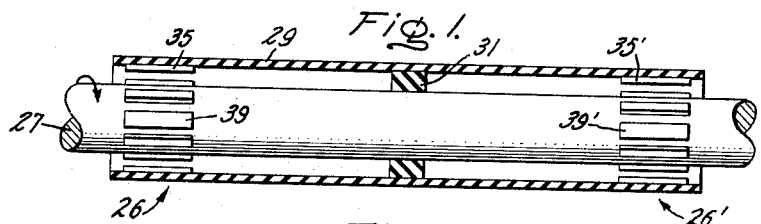
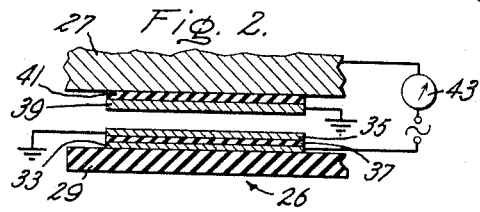
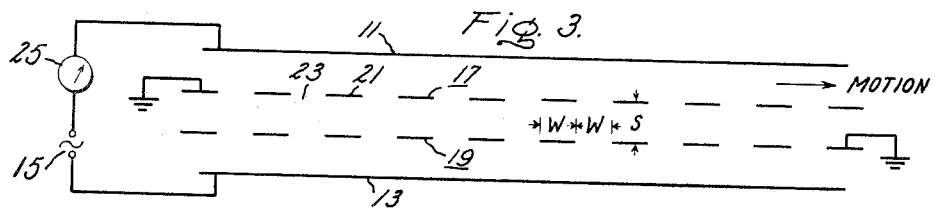
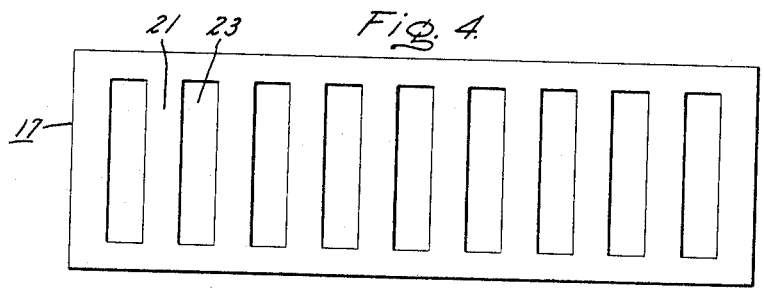
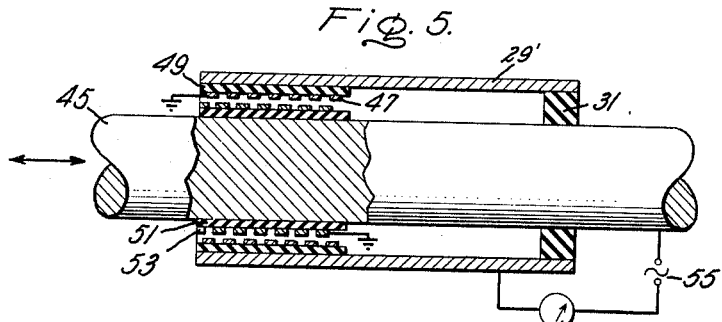
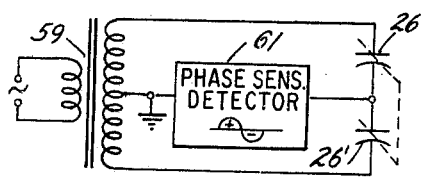
Inventor:
David L. Hillhouse,
by Donald R. Campbell
His Attorney.

United States Patent Office 3,487,402
Patented Dec. 30, 1969

3,487,402
DIGITAL CAPACITANCE MOTION TRANSDUCER
David L. Hillhouse, Huntsville, Ala., assignor to General Electric Company, a corporation of New York
Filed Sept. 8, 1966, Ser. No. 577,939
Int. Cl. H04l 3/00; H03k 13/00
U.S. Cl. 340—347
7 Claims

ABSTRACT OF THE DISCLOSURE

A digital capacitance motion transducer for producing a binary indication of the displacement of a sensing element comprises a three-terminal capacitor with shutter members between the active electrodes comprising a plurality of spaced parallel strips movable in response to the sensing element alternately between electrical shielding and unshielding positions to cyclically vary the capacitance between the active electrodes. Applications include a torquemeter and a strain gauge.

---

This invention relates to digital motion transducers, and more particularly to such a transducer operating on the principle of variable capacitance.

A digital motion transducer produces a digital output directly in response to a motion or displacement as an input parameter. Measuring or sensing in this manner avoids the difficulty with analog sensors which occurs when the output data are transmitted to another point for data handling and suffers distortion due to limitations in the transmission equipment such as line loss, interference and pick-up. In this case efforts to improve the analog sensor are to no avail when not accompanied by corresponding improvements in transmission. These limitations are avoided in systems where only digital data are produced and transmitted. A true digital sensor responds to an input parameter by generating a digital output. It produces digital data without first generating an analog signal and then converting. Since only digital data need be transmitted to data handling equipment, more of the information content and accuracy of the data is preserved. Thus, the full accuracy capability of digital transducers can be utilized. Although digital motion transducers employing modulation of light have been proposed, these optical transducers require a light source, which tends to be failure-prone, and also require associated optical apparatus.

An object of the invention is to provide a generally improved and more satisfactory digital motion transducer operating on the principle of variable capacitance.

Another object is the provision of a new and improved binary digital motion transducer which is reliable and relatively inexpensive and simple in construction.

Yet another object is to provide new and improved instruments such as a digital torquemeter and a digital strain-gauge employing a digital capacitance motion transducer.

In accordance with the invention, the capacitance between two equidistant active electrodes or plates is varied cyclically by shutter means which are maintained at a selected potential and which are movable between the electrodes alternately between electrical shielding and unshielding positions in response to displacement of a sensing element. Preferably the shutter means comprises at least two shutters at ground potential which are mounted between the plates for relative motion. The shutters comprise a series of spaced parallel strips which, as the shutters move relative to one another, are alternately in register and out of register to vary the capacitance between a maximum value and a minimum value, and produce a binary indication. One shutter is preferably fixed while the other is displaced according to the parameter being measured. Means are provided for detecting the cyclical variations of capacitance to provide a binary indication of the displacement related to the pitch of the shutter strips.

In a digital torquemeter, one capacitor plate and the movable shutter are secured about a shaft to which torque is applied, and have relative movement with respect to the other shutter and plate which are secured to a fixed sleeve concentric with the shaft. In a strain gauge, a similar arrangement is used but the shutter strips are circumferential rather than longitudinal along the shaft as in the torquemeter.

The foregoing and other objects, features and advantages of the invention will be apparent from the following more particular description of preferred embodiments of the invention, as illustrated in the accompanying drawing wherein:

FIG. 1 is a side view of a torquemeter employing a digital capacitance motion transducer according to the invention, parts being broken away and shown in section;

FIG. 2 is an enlarged cross-sectional view of a portion of the apparatus shown in FIG. 1 further including schematic electrical circuitry;

FIG. 3 is a schematic cross-sectional view of a capacitance motion transducer illustrating the principle of the invention;

FIG. 4 is a face view of a shutter shown in FIG. 3;

FIG. 5 is a cross-sectional view, partly in side elevation and including schematic circuitry, of a digital strain gauge; and FIG. 6 is a schematic circuit diagram of a circuit for detecting and indicating in binary form the cyclical variations in capacitance obtained by operation of the torquemeter ilustrated in FIGS. 1 and 2.

Referring first to FIGS. 3 and 4, a capacitor has two equidistant active electrodes or parallel plates 11 and 13, one of which, such as the plate 11, is at a high potential, while the other plate, such as the plate 13, is at a low potential as for instance by being connected across A.C. source 15. A suitable dielectric medium is located between the active electrodes. The capacitance between the two plates 11 and 13 is varied cyclically in response to motion or displacement of the parameter being measured. This is conveniently achieved by means of two shutter members or guard electrodes 17 and 19 mounted between the active electrodes 11 and 13 for movement relative to one another between shielding and unshielding positions. Each shutter member is preferably comprised of a series of parallel conductive strips 21 spaced from one another by openings or slots 23. The conductive strips 21 are connected together at one or both ends and the entire shutter is at a suitable selected potential, preferably at ground potential. The two shutters 17 and 19 are identical and desirably the width of each shutter strip 21 is equal to the width of one of the openings or slots 23. The shutters 17 and 19 are mounted within the capacitor between the plates 11 and 13 for movement relative to one another to alternately move the conductive strips in the two shutters into register and out of register. Desirably one shutter, such as shutter 19, is fixed in place, while the other shutter, such as shutter 17, has motion or displacement in accordance with the parameter being measured.

It is seen that as the shutter 17 is moved relative to the fixed shutter 19, the shutter strips 21 in the two shutters are alternately in register or superimposed upon one another, and out of register. For equal widths W of the shutter strips 21 and openings 23, the mechanical length of a cycle is 2W. With the two shutters in register or open, the capacitance between the active electrodes 11 and 13 is at a maximum, and the capacitance decreases continuously until the two shutters are most completely out of register or closed at which point the capacitance is at a minimum. Thus there is a cyclical variation between the maximum and minimum capacitance as the movable shutter 17 is translated with respect to the fixed shutter 19. By detecting this cyclical capacitance variation, a binary indication is obtained of the displacement of the shutter 17 which is actuated by the sensing device. Indicating device 25 is shown connected in the supply circuit for detecting this capacitance variation, however it will be understood that this is a diagrammatic representation. For instance, the capacitor may form one arm of an A.C. bridge, the adjacent arm of which contains a fixed capacitor whose value has been selected such that the bridge is driven back and forth through null each cycle. A phase-sensitive detector connected in the bridge then gives a plus and minus indication for each cycle, or a binary manifestation of motion related to the pitch of the shutters. By summing the indications for each cycle, the total extent of displacement is obtained.

A suitable detecting and indicating circuit will be further explained with regard to FIG. 6. It is necessary to employ a three-terminal measurement of capacitance variation. Thus the shutters are isolated from the active electrodes and may be at the high potential as well as at ground, though it is preferred that the shutters be at ground as a selected potential. The selected potential at which the shutters 17 and 19 are maintained is chosen to give an appropriate shielding effect and in accordance with the requirement of the indicating device for measuring capacitance variations. The cyclical capacitance variations of three-terminal measurement configurations is up to approximately fifty times greater than that for the simpler two-terminal capacitor configuration, for a given $S/W$ ratio. This much higher sensitivity is essential for small shutter strip widths W of about 1 mil or less in order to obtain useable measurements. Examples of two-terminal configurations which do not give the higher sensitivity are a capacitor made up of only one narrow plate and one of the shutters 17 or 19, or made up of only the two shutters 17 and 19. A three-terminal configuration which gives better results (although not as good as those obtained from the FIG. 3 arrangement) comprises one of the shutters 17 or 19 between a narrow plate having a width slightly greater than the shutter width W and an elongated plate like the plates 11 or 13.

The magnitude of modulation of capacitance, i.e., the ratio of maximum capacitance to minimum capacitance, depends primarily on the ratio of the width W of a conductive strip 21 (shutter width) to the separation S between the two shutters 17 and 19. The smaller the ratio $S/W$, the larger the modulation. This is as expected, as can be visualized by keeping the width W constant as the separation S is varied. For smaller separations S the shielding is much more effective when the shutters are out of register than is the case when the separation is much larger. Usable results are obtained for an $S/W$ ratio of about 1.5, and the capacitance modulation is very large at small $S/W$. Also, the shutter width W may be very fine while still obtaining a workable device. Capacitor rulings similar to fine-ruled optical gratings can be used having up to about 1000 lines per inch. While for some applications the shutter strips will be uniform over the entire shutter, i.e., there is one row of shutter strips and openings having a constant shutter width W, there are more applications where several rows of shutter strips and openings are provided extending parallel to one another over the width of the shutter, each row having a different shutter width and representing a bit of a binary number. Thus, it is possible to read out in parallel the various bits of the binary number, and in this case each higher order bit will have a shutter width W double that of the next lower order bit, and so on.

The digital capacitance motion transducer herein described can be utilized in a wide variety of transducer applications. Any parameter such as temperature, acceleration or pressure which can be converted to mechanical motion can be measured with this transducer. For instance, pressure transducers commonly are analog type sensors which use a diaphragm or bellows to convert the pressure to a force and then to a displacement. It is seen that the digital displacement transducer is a basic sensor that can be modified to form a family of transducers for many applications. Two such applications will now be described. In FIGS. 1 and 2 is shown a capacitive digital torque transducer or torque meter, and in FIG. 5 is shown a capacitive digital strain gauge. In general the digital capacitance motion transducer has the advantages of being rugged and reliable while yet being relatively simple both mechanically and electrically.

The digital torquemeter (FIGS. 1 and 2) employs a pair of capacitive motion transducers 26 and 26' in order to improve the sensitivity. The circular shaft 27 to which torque is applied extends through a larger concentric cylindrical tube 29 and is fastened to the tube at its center by ring 31. Both the tube 29 and ring 31 are made of an insulating material. At the left hand side of tube 29, one active electrode plate 33 and the fixed shutter 35 are made up in the form of a tape separated by insulating material 37 and adhered circumferentially to the inside of the periphery of the tube 29 with the shutter strips or rulings running longitudinally of the tube. The movable shutter 39 is likewise made up in the form of a tape and is adhered to insulating material 41. The proper length is cut off and secured circumferentially about the outside of shaft 27. Proper electrical connections are made to ground the two shutters 35 and 39 and to connect the active electrodes 27 (the shaft) and 33 to an alternating current supply voltage and an indicating device 43, here indicated diagrammatically.

As the torque is applied to the shaft 27 causing it to twist, the movable shutter 39 attached to the shaft is displace rotatively with respect to the fixed shutter 35 attached to the cantilevered tube 29. At the right hand side of tube 29 is a similar digital capacitance motion transducer wherein like parts are designated by like primed numerals. As the transducer at the left hand side of tubes 9 is displaced in one direction, the transducer at the right hand side is displaced an equal amount in the other direction. When the shutters 35' and 39' of the right hand transducer are mechanically 180 degrees out of phase with the shutters 35 and 39 on the left hand transducer, and the two capacitors are placed on each side of an A.C. bridge, the effective amplitude of modulation is doubled. Referring to FIG. 6, the bridge comprises a center-tapped transformer 59 with one capacitor plate connected to each end of the transformer and the other plates coupled together and to the center tap through a detecting voltmeter. The bridge is driven back and forth through null during each cycle. A phase-sensitive detector 61 then produces a plus or minus indication during each cycle which can be used as a binary "one" or "zero" indication of motion related to the pitch of the shutters. Resolution and sensitivity can be improved by enlarging the diameter of the transducers.

The capacitive digital strain gauge shown in FIG. 5 has a similar construction and operation. The shaft 45 to be stretched or compressed extends through surrounding spaced tube 29' which in this case is made of a conductive metal and forms an active electrode or capacitor plate. The fixed shutter 47 is secured to insulating material 49 and adhered to the inside periphery at the end of tube 29', however for this application the shutter strips run circumferentially about the tube rather than longitudinally along the tube as was the case with the torque transducer. The shaft 45 is the low electrode and has adhered about its periphery a layer of insulating material 51 to which is secured the movable shutter 53. The two shutters 47 and 53 are indicated as being grounded, and in a schematic manner the active electrodes 29' and 45 are shown as being connected to an A.C. source 55 through an indicating device 57. The gauge distance is the distance between the transducer and mounting ring 31. In the use of the strain gauge, stretching or compressing the shaft 45 displaces the movable shutter 53 relative to the fixed shutter 47 and cyclically varies the capacitance between capacitor electrodes 29' and 45, the number of cyclic variations being related to the strain.

One important advantage over the conventional strain gauges is that bonding to the part is not nearly so important, since the output of this transducer does not depend on stretching the sensing element. This advantage also applies to the capcitive torque transducer. This strain gauge moreover does not require a temperature compensation. Also, each shutter with its layer of insulation material may be made up in the form of a composite tape which can be wrapped around and adhered to a shaft or a tube in a much less critical manner as compared to the bonding of the conventional strain gauge.

While the invention has been particularly shown and described with reference to preferred embodiments thereof, it will be understood by those skilled in the art that various changes in form and details may be made therein without departing from the spirit and scope of the invention

What I claim as new and desire to secure by Letters Patent of the United States is:

1. A digital capacitance motion transducer comprising
   a three-terminal capacitor including a pair of substantially equidistant active electrodes having a dielectric medium therebetween, said capacitor being adapted to be connected in an energizing circuit,
   shutter means maintained at a selected electric potential and mounted between said active electrodes for movement alternately between electrical shielding and unshielding positions in response to displacement of a sensing element to produce cyclical variations of the capacitance between the active electrodes, and
   means for detecting the cyclical variations of capacitance and producing a binary indication of the displacement.

2. A construction as defined in claim 1 wherein said shutter means comprises a pair of shutter members mounted between said active electrodes for movement relative to one another.

3. A construction as defined in claim 1 wherein said shutter means comprises a pair of planar shutter members maintained approximately at ground potential and mounted between sid active electrodes for movement relative to one another,
   said shutter members each having a series of spaced parallel strips which alternately move into register and out of register as the shutter members are displaced relative to one another, to cyclically vary the capacitance between the active electrodes.

4. A digital capacitance motion transducer for a sensing element comprising:
   a three-termial capacitor including a pair of substantially equidistant active electrodes having a dielectric medium therebetween, said capacitor being adapted to be connected in an energizing circuit,
   a pair of conductive shutter members,
   said shutter members being maintained approximately at ground potential and being mounted between said active electrodes for movement substantially parallel to one another,
   one of said shutters being fixed while the other is coupled for movement in accordance with the displacement of the sensing element,
   each of said shutter members having a series of spaced parellel strips which are movable alternately into register and out of register to produce cyclical variations of the capacitance between the active electrodes, and
   means for detecting the cyclical variations of capacitance and producing a binary indication of the displacement.

5. A construction as defined in claim 4 wherein the sensing element is in the form of a shaft having a circular cross section,
   one of the active electrodes and said movable shutter member being displaced in accordance with movement of the shaft,
   the other of the active electrodes and said fixed shutter member being contained on a fixed tube concentric with the shaft.

6. A construction as defined in claim 4 wherein said parallel strips comprising each of said shutter members and the spaces between the individual parallel strips all have the same width.

7. A construction as defined in claim 4 wherein said means for detecting the cyclic variations of capacitance and producing a binary indication of the displacement comprises an A-C bridge having a center-tapped secondary winding and the series combination of said capacitor and another capacitor connected across said secondary winding, the junction of said capacitors being connected through a phase-sensitive detector to the secondary winding center tap.

References Cited

UNITED STATES PATENTS

| | | | |
|---|---|---|---|
| 2,485,617 | 10/1949 | Lundberg | 317—249 |
| 2,766,623 | 10/1956 | De Giers | 317—246 |
| 2,886,717 | 5/1959 | Williamson et al. | |
| 2,978,638 | 4/1961 | Wing et al. | 317—249 |
| 3,147,374 | 9/1964 | Diamond | 317—249 |
| 3,218,635 | 11/1965 | Masur | 317—249 |
| 3,223,842 | 12/1965 | Hyde | 340—347 |
| 3,253,207 | 5/1966 | Jauch | 320—1 |

MAYNARD R. WILBUR, Primary Examiner

J. GLASSMAN, Assistant Examiner

U.S. Cl. X.R.

317—255